US008082391B2

(12) United States Patent
Brown et al.

(10) Patent No.: US 8,082,391 B2
(45) Date of Patent: Dec. 20, 2011

(54) COMPONENT DISCOVERY IN MULTI-BLADE SERVER CHASSIS

(75) Inventors: Deanna Lynn Quigg Brown, Queen Creek, AZ (US); Jason James Graves, Gilbert, AZ (US); Robert Akira Kubo, Tucson, AZ (US); Bryan John Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 12/206,497

(22) Filed: Sep. 8, 2008

(65) Prior Publication Data

US 2010/0064102 A1  Mar. 11, 2010

(51) Int. Cl.
*G06F 12/00* (2006.01)
(52) U.S. Cl. .................................................... 711/114
(58) Field of Classification Search ................ None
See application file for complete search history.

(56) References Cited

U.S. PATENT DOCUMENTS

| | | | |
|---|---|---|---|
| 7,165,116 B2 | 1/2007 | Grove et al. | |
| 7,584,319 B1* | 9/2009 | Liao et al. ................. | 710/317 |
| 2005/0080881 A1* | 4/2005 | Voorhees et al. ............ | 709/220 |
| 2006/0218289 A1 | 9/2006 | Assad | |
| 2006/0230125 A1 | 10/2006 | Johnson | |
| 2007/0110066 A1 | 5/2007 | Chen | |
| 2007/0162592 A1 | 7/2007 | Marks et al. | |
| 2008/0126696 A1* | 5/2008 | Holland et al. ............ | 711/114 |
| 2008/0155145 A1 | 6/2008 | Stenfort | |

OTHER PUBLICATIONS

IBM, "Dual SAS Expanders Provide Independent SAS Domains for HA Connectivity and DA Connectivity in a Homogenous Storage Subsystem" IP.com Document No. IPCOM000167126D, Jan. 31, 2008.
IBM, "Method of Mapping Server Blade IP Address to a Chassis Position for Remote Management" IP.com Document No. IPCOM000148201D, Mar. 29, 2007.
IBM, "Autonomous Configuration on Legacy Networks" IP.com Document No. IPCOM000012038D, Apr. 3, 2003.
J. Tseng et al., "Internet Storage Name Service (iSNS) (RFC4171)" IP.com Document No. IPCOM000128857D, Sep. 1, 2005.

* cited by examiner

*Primary Examiner* — Duc Doan
(74) *Attorney, Agent, or Firm* — Griffiths & Seaton PLLC

(57) ABSTRACT

An I/O module includes a switch module, a redundant array of independent disks (RAID) controller and a baseboard management controller (BMC). A first address for a first component of the plurality of components is received. The first address is provided by a user. The switch module is queried for additional addresses for additional components of the plurality of components. The switch module obtains the additional addresses for the additional components from a first persistent storage location associated with the switch module. The first and additional addresses for the first and additional components are stored in a second persistent storage location accessible by the BMC, the switch module, and the RAID controller. Synchronization of the first and additional addresses for the first and additional components in the second persistent location is controlled by the BMC.

20 Claims, 3 Drawing Sheets

COMPONENT DISCOVERY IN MULTI-BLADE SERVER CHASSIS

BACKGROUND OF THE INVENTION

1. Technical Field

The present invention relates in general to computers, and more particularly to a method, system, and computer program product for discovering components in a multi-blade server chassis.

2. Description of Related Art

Multiple blade servers are computers that consolidate high-density server boards (blades) in a single blade chassis (server blade chassis). Typically, a blade chassis accommodates multiple hot-swappable blades.

Server blades are widely used in datacenters to save space and improve system management. Either self-standing or rack mounted, the blade chassis provides the power supply. Each blade may have its own central processing unit (CPU), memory, and hard disk. Server blades generally provide their own management systems and may include a network or storage switch.

Most computer systems require storage and a means of accessing the storage. Storage may be accessed by means of redundant array of independent disks (RAID) controllers, either singular or redundant. The RAID controllers in turn provide connectivity to the fundamental storage, such as hard disk drives.

SUMMARY OF THE INVENTION

A multi-blade server chassis may include various components, such as the aforementioned switch, RAID subsystem (including the RAID controllers), and individual server blades. Each of these components resides in a physical location, and are dependent upon each other. When setting up the chassis, each of the components has its own internet protocol (IP) address. The RAID subsystem, for example, has two IP addresses, one for each controller.

Without a discovery mechanism, a user must manually add each individual component, including such information as an IP address and additional information needed to create and establish the relationship between components in the chassis. For one embodiment, this includes adding a total of four IP addresses, two for the RAID subsystem, and one for each switch. In addition, without a verification mechanism, there is no way to verify the user-based input of component relationships is accurate.

In light of the foregoing, a need exists for a discovery and verification mechanism to assist a user in adding components and verifying component relationship in a multi-blade server chassis. Accordingly, in one embodiment, by way of example only, a method for discovering components on a multi-blade server chassis having an input/output (I/O) module in communication with a plurality of components managed by an advanced management module (AMM) is provided. The I/O module includes a switch module, a redundant array of independent disks (RAID) controller and a baseboard management controller (BMC). A first address for a first component of the plurality of components is received. The first address is provided by a user. The switch module is queried for additional addresses for additional components of the plurality of components. The switch module obtains the additional addresses for the additional components from a first persistent storage location associated with the switch module. The first and additional addresses for the first and additional components are stored in a second persistent storage location accessible by the BMC, the switch module, and the RAID controller. Synchronization of the first and additional addresses for the first and additional components in the second persistent location is controlled by the BMC.

In another embodiment, again by way of example only, a system for discovering components on a multi-blade server chassis having a plurality of components managed by an advanced management module (AMM) is provided. An input/output (I/O) module is in communication with the AMM. The I/O module includes a switch module, a redundant array of independent disks (RAID) controller and a baseboard management controller (BMC). The I/O module is adapted for receiving a first address for a first component of the plurality of components, wherein the first address is provided by a user, querying the switch module for additional addresses for additional components of the plurality of components, wherein the switch module obtains the additional addresses for the additional components from a first persistent storage location associated with the switch module, and storing the first and additional addresses for the first and additional components in a second persistent storage location accessible by the BMC, the switch module, and the RAID controller. Synchronization of the first and additional addresses for the first and additional components in the second persistent location is controlled by the BMC.

In still another embodiment, again by way of example only, a computer program product for discovering components on a multi-blade server chassis having an input/output (I/O) module in communication with a plurality of components managed by an advanced management module (AMM) is provided. The I/O module includes a switch module, a redundant array of independent disks (RAID) controller and a baseboard management controller (BMC). The computer program product comprises a computer-readable storage medium having computer-readable program code portions stored therein. The computer-readable program code portions comprise a first executable portion for receiving a first address for a first component of the plurality of components, wherein the first address is provided by a user, a second executable portion for querying the switch module for additional addresses for additional components of the plurality of components, wherein the switch module obtains the additional addresses for the additional components from a first persistent storage location associated with the switch module, and a third executable portion for storing the first and additional addresses for the first and additional components in a second persistent storage location accessible by the BMC, the switch module, and the RAID controller. Synchronization of the first and additional addresses for the first and additional components in the second persistent location is controlled by the BMC.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for simplifying and automating the discovery and verification process of components in a multi-blade server chassis. The illustrated embodiments facilitate communication between an advanced management module (AMM) and other components within the multi-blade server chassis. Such facilitation may be made possible, for example, using an application programming interface (API) to perform such functionality. This functionality simplifies the configuration process of components in the multi-blade server chassis. In one embodiment, for example, the user need only enter a single IP address for a component, while the mechanisms of the present invention obtain remaining IP addresses and component information for the remaining components. All network port IP information needed to manage the components may be persistently stored on switch, RAID controller, and media tray components residing in the chassis, and synchronization between the components may be controlled by a baseboard management controller (BMC) residing in or otherwise associated with an input/output (I/O) module operational on the chassis.

Figure 1:
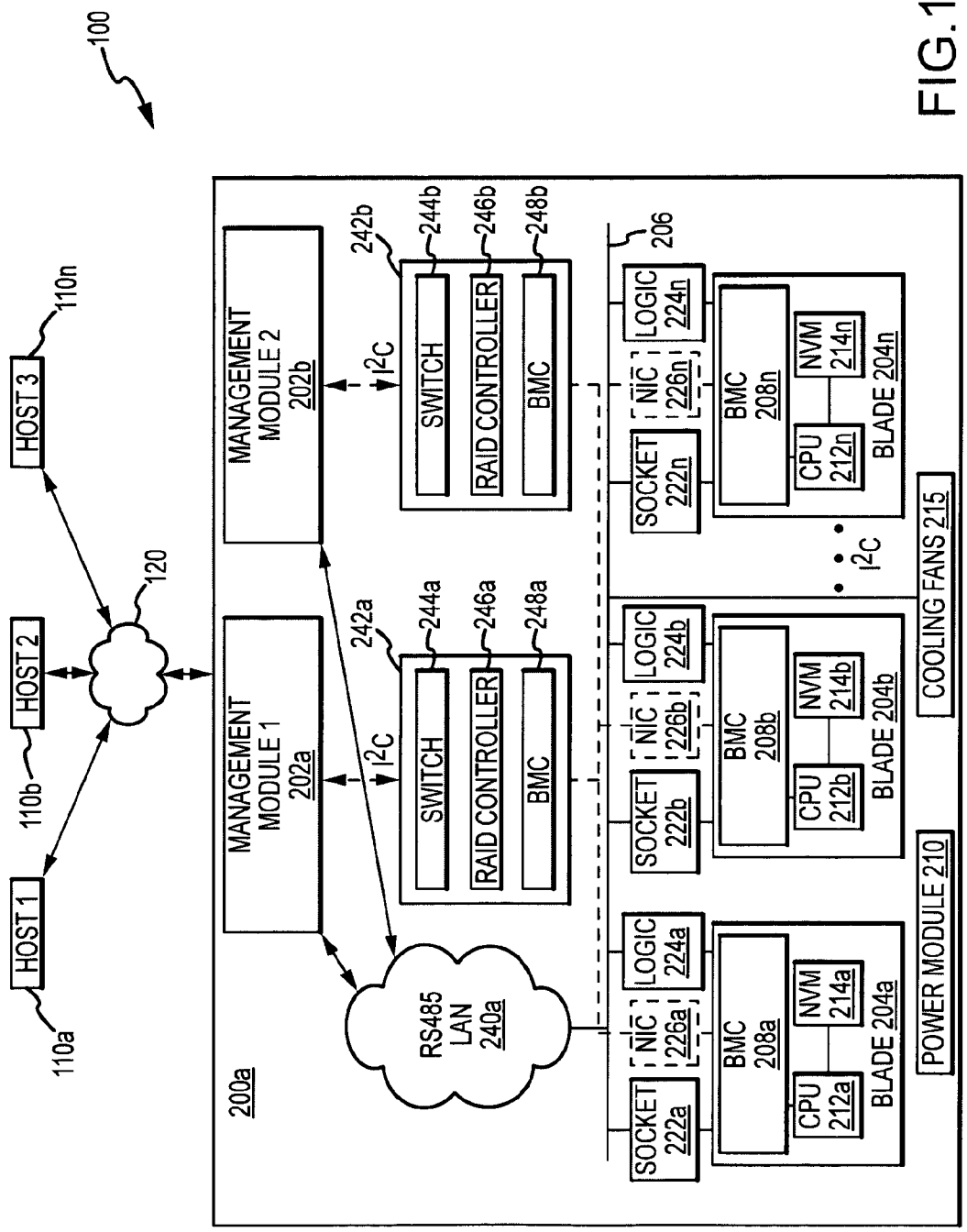
FIG. 1 is an exemplary multi-blade server chassis in which various aspects of the following description and claimed subject matter may be implemented.

FIG. 1 is an exemplary block diagram of a computing environment 100 having several hosts with access to a multi-blade server chassis. For the sake of clarity, three hosts 110a,b,n are depicted. However, additional hosts may be associated with the chassis as one skilled in the art will appreciate. Hosts 110a,b,n are connected through a network fabric 120 to a multi-blade server blade chassis 200a. Again, for the sake of clarity, only three server blades 204a,b,n are depicted. However, in one embodiment, server blade chassis 200a has a midplane 206 capable of connecting fourteen or more server blades 204.

Server blade chassis 200a has one or more advanced management modules (AMM) 202. In the depicted embodiment, server blade chassis 200a has a primary advanced management module 202a and a back-up advanced management module 202b. Each management module 202 is capable of managing multiple server blades 204. During normal operations, one of the local management modules 202a or 202b are coupled to server blades 204a-n via a Local Area Network (LAN) 240a, a midplane 206, and a plurality of Baseboard Management Controllers (BMCs) 208 (each server blade 204 having a BMC 208) to form an in-band management pathway. LAN 240 and BMC 208 are discussed in further detail below.

Midplane 206 is a backplane, mounted in the middle of server blade chassis 200a, that contains circuitry and sockets 222 into which additional electronic devices or cards, including server blades 204 may be inserted. Midplane 206 contains at least one bus for secure in-band internal communication between management module 202 and server blades 204a-n, as well as between and among server blades 204a-n themselves, via respective BMCs 208a-n.

When a server blade 204 is inserted into a specific socket 222, a physical address is established for that server blade 204. For example, consider server blade 204a being inserted into socket 222a. A control logic 224a detects the presence of server blade 204a in socket 222a. Logic 224a may comport with the Electronics Industry Association (EIA) RS485 Standard for data communication. In other embodiments, Logic 224a may be compliant with the Phillips' Inter-IC (Inter-Integrated Circuit) standard (incorporated by reference in its entirety herein and commonly referred to as "I²C"), or with an Ethernet network standard. Logic 224a, operating in conjunction with management module 202, assigns a physical address on a bus in midplane 206 to server blade 204a when server blade 204a is inserted into socket 222a. Each server blade 204 may be associated with a unique logic 224 that is connected to midplane 206 as depicted in FIG. 2a. Alternatively, all server blades 204 may use a single logic 224.

Each server blade 204 may have a unique Internet Protocol (IP) address on midplane 206. That is, midplane 206 may support intercommunication using IP addressing protocol, in which each device connected or coupled to midplane 206 contains an IP address assigned by logic (not shown) that is either within or outside server blade chassis 200. For example, a Dynamic Host Configuration Protocol (DHCP) server may be used to assign an IP address to server blade 204a. Communication with server blade 204a is thereafter via a Network Interface Card (NIC) 226a that is associated with server blade 204a.

In accordance with the illustrated embodiment, an I/O module 242a is connected to NIC 226a. Module 242a may be used in pairs (e.g., module 242b) to provide redundancy. I/O module 242a includes an integrated switch module 244a, such as a serial attached SCSI (SAS) switch module. Switch modules 242a, 242b provide connectivity to Ethernet or SAS, for example. RAID controllers 246a and 246b are incorporated into the I/O modules 242a and 242b. The RAID controllers 246a, 246b do not take up a blade slot. RAID controller 246a is interconnected to RAID devices, such as storage devices in a RAID configuration. The RAID devices located within one or more blades 204. The RAID controllers 246a, 246b and attached RAID devices may collectively be thought of as a RAID subsystem of the server blade chassis.

A baseboard management controller (BMC) 248a is also integrated into the I/O module 242a. BMC 248a may be adapted to store IP addresses of various components of chassis 200a in several locations. A copy may be stored in a persistent storage location of each switch module 244a. A copy may be stored in a persistent storage location of RAID controller 246a. A copy may be stored in persistent storage of a media tray (not shown). Similarly, a copy may be stored in switch module 244b and RAID controller 246b. The BMC 248a, in cooperation with the I/O module 242a, controls the process of synchronizing the various copies. In addition to controlling synchronization of component addresses, the BMC 248a, and I/O module 242a may be adapted to perform additional functionality as will be described, following.

Each server blade 204 may have at least one central processing unit (CPU) 212, and a non-volatile memory (NVM) 214. NVM 214 is a Flash Read Only Memory ("Flash ROM" or "Flash Memory") that can be erased and reprogrammed in units of memory referred to as "blocks." NVM 214 may also include non-volatile Electrically Erasable Programmable Read Only Memory (EEPROM) that is similar to Flash Memory, except that EEPROM is erased and rewritten at the byte level and is usually smaller in capacity. The server blade 204 may be oriented as a storage blade (with a number of integrated storage devices such as disk drives) or a processor blade (with one or more processing devices) for performing computing processing.

When a server blade 204 is shipped from a manufacturer, the NVM 214 may be pre-burned with firmware, including a BIOS as well as software for monitoring the server blade 204.

Such monitoring may include controlling Direct Access Storage Devices (DASD's), monitoring and controlling voltages throughout the system, determining the power-on status of the server blade 204, requesting access to a shared keyboard, video, mouse, Compact Disk-Read Only Memory (CD-ROM) and/or floppy disk drives, as well as monitoring the Operating System (OS) running on the server blade 204.

Advanced management modules 202 are capable of detecting the presence, quantity, type and revision level of each server blade 204, power module 210, and midplane 206 in the system. Management modules 202 may also directly control the operation of each server blade 204 and the power module 210, and may directly (without using the BIOS in the server blades 204) or indirectly (using the BIOS) control the operation of cooling fans 215 and other chassis 200a components.

Each server blade 204 has a BMC 208 that provides local supervisory control of the server blade 204 to which the BMC 208 is associated. Each BMC 208 is able to communicate with a local management module 202 by either using communication path 240a (in-band network) or alternatively by using switches 242a and NICs 226 (out-of-band network). The local management modules 202a, 202b may utilize a variety of communications paths 240a, such as an RS485 path 240a, a LAN path 240a and an I$^2$C path 240a to communicate with each blade 204.

LAN 240 is an in-band network also comporting with the Electronics Industry Association (EIA) RS485 Standard for data communication. Management modules 202 (either primary management module 202a or back-up management module 202b if management module 202a is down) communicate via LAN 240 with BMC 208, which includes logic for coordinating communication with server blades 204 via sockets 222.

LAN 240a may be configured to allow communications between server blades 204a-n and the management modules 202a, 202b relating to the remote BIOS settings and BIOS management. The blades 204a-n may leverage BMCs 208a-n as proxies to communicate with the management modules 202a, 202b through the RS485 protocol. Similarly, the management modules may leverage BMCs 208a-n as proxies to communicate with the blades 204a-n through the RS485 protocol. In an alternative embodiment, an RS485 connection may be separately made between each blade 204a-n and the management modules 202a, 202b. Additionally, other communications protocols and paths may be utilized, such as the aforementioned I$^2$C channel or the aforementioned TCP/IP and/or Ethernet channel over switches 244.

Chassis 200a may follow a predetermined policy upon setup in which addresses of various components in the chassis 200a are propagated throughout. For example, in one embodiment, the AMM 202 notifies the switch module 244 of any IP address changes. The switch module 244 in turn notifies the BMC 248. Once the BMC 248 is notified of an IP address change, the BMC 248 queries the IP address information from the switch persistent storage, and updates the component IP address list in another area of the switch persistent storage. The BMC 248 also updates the component IP address list in an area of persistent storage resident in the RAID controller 246. The BMC 248 then notifies the partner I/O module BMC 248 to update its component IP address list. The partner BMC 248 then updates the persistent storage in its associated switch module 244 and RAID controller 246.

In chassis 200a, both switch modules 244a and 244b have access to the management modules 202a and 202b, including information stored within the modules 202a and 202b. The RAID subsystem, including RAID controllers 246a and 246b, does not have this access. Since the RAID subsystem is managed via a different interface, the subsystem has no way of knowing which chassis the subsystem belongs to, which switch 244a or 244b it is packaged with, or what other switches are in the same chassis 200a. The relationship among switches 244a and 244b and their respective RAID subsystems is necessary in order to configure host access to the RAID subsystem, and to perform service and maintenance operations.

To simplify the user experience in managing chassis 200a, an API may be implemented as previously described, that allows switches 244 to access and persist all network information, such as port IP addresses of the devices. For example, in one embodiment, the API may be operational as software, firmware, hardware, or a combination thereof operable on a particular blade 204. In this way, CPU 212 and NVM 214 may be utilized to execute and store processing instructions relating to the operation of the API. The API may be configured to maintain a relationship between the management modules 202 and switches 244. As a result, the API may be adapted to determine information such as port IP addresses from the switches 244 and provide the information as an intermediary to other chassis 200a components, such as the BMCs 248.

The API may be adapted to query the switch(es) 244 for the address or other information, based on initial information provided by a user, such as an initial address. For example, in one embodiment, based on an IP address provided by a user, the API may then query switch(es) 244 for additional addresses of additional components (e.g., remaining 3 IP addresses). The switches 244 may obtain the information from their persistent storage, this storage having been populated by BMCs 248. The API may then validate the information, perhaps notifying the user the additional addresses and that the addresses are valid. The API may then persistently store the addresses in locations accessible by the BMCs 248, the switches 244, and the RAID controllers 246.

Figure 2:
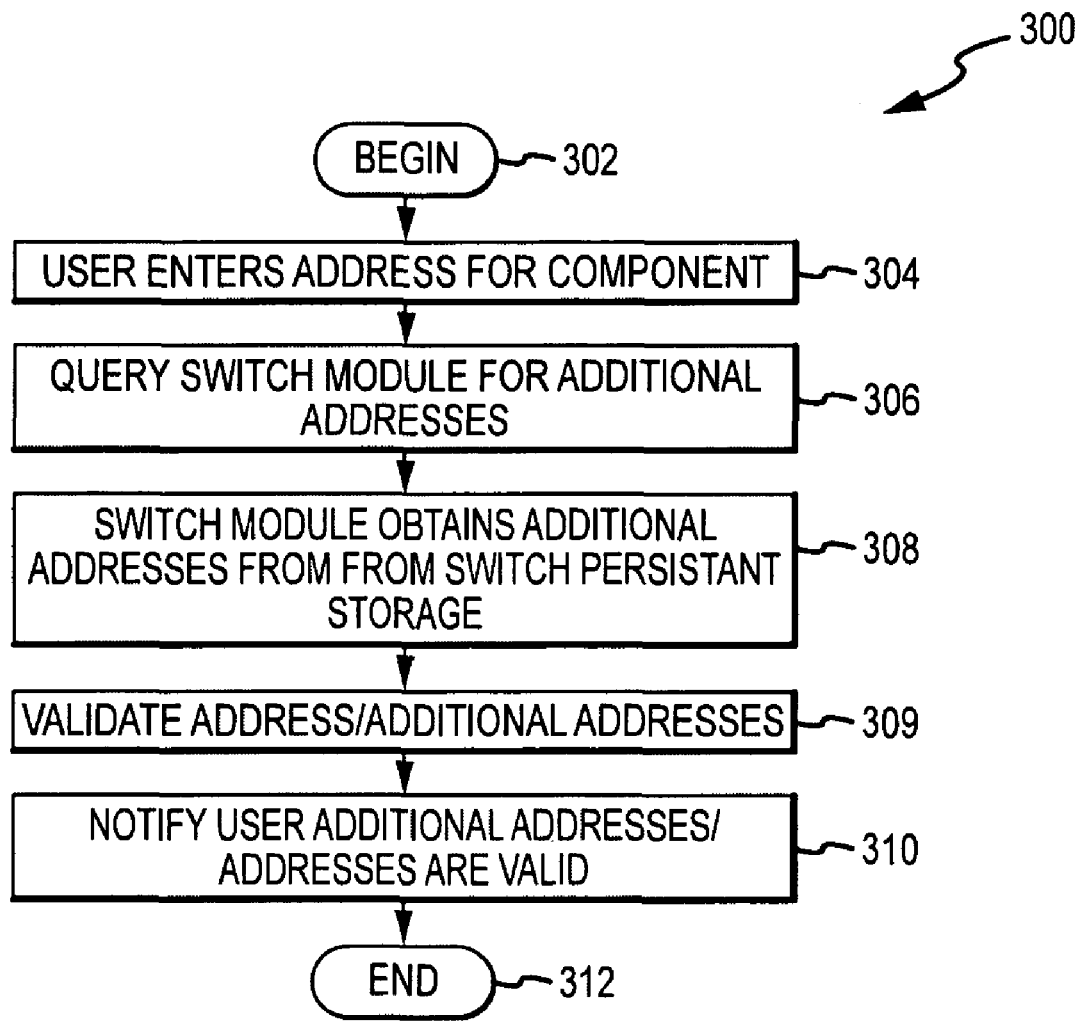
FIG. 2 is a flow chart diagram of an exemplary method for discovering and validating components in a multi-blade server chassis.
Figure 3:
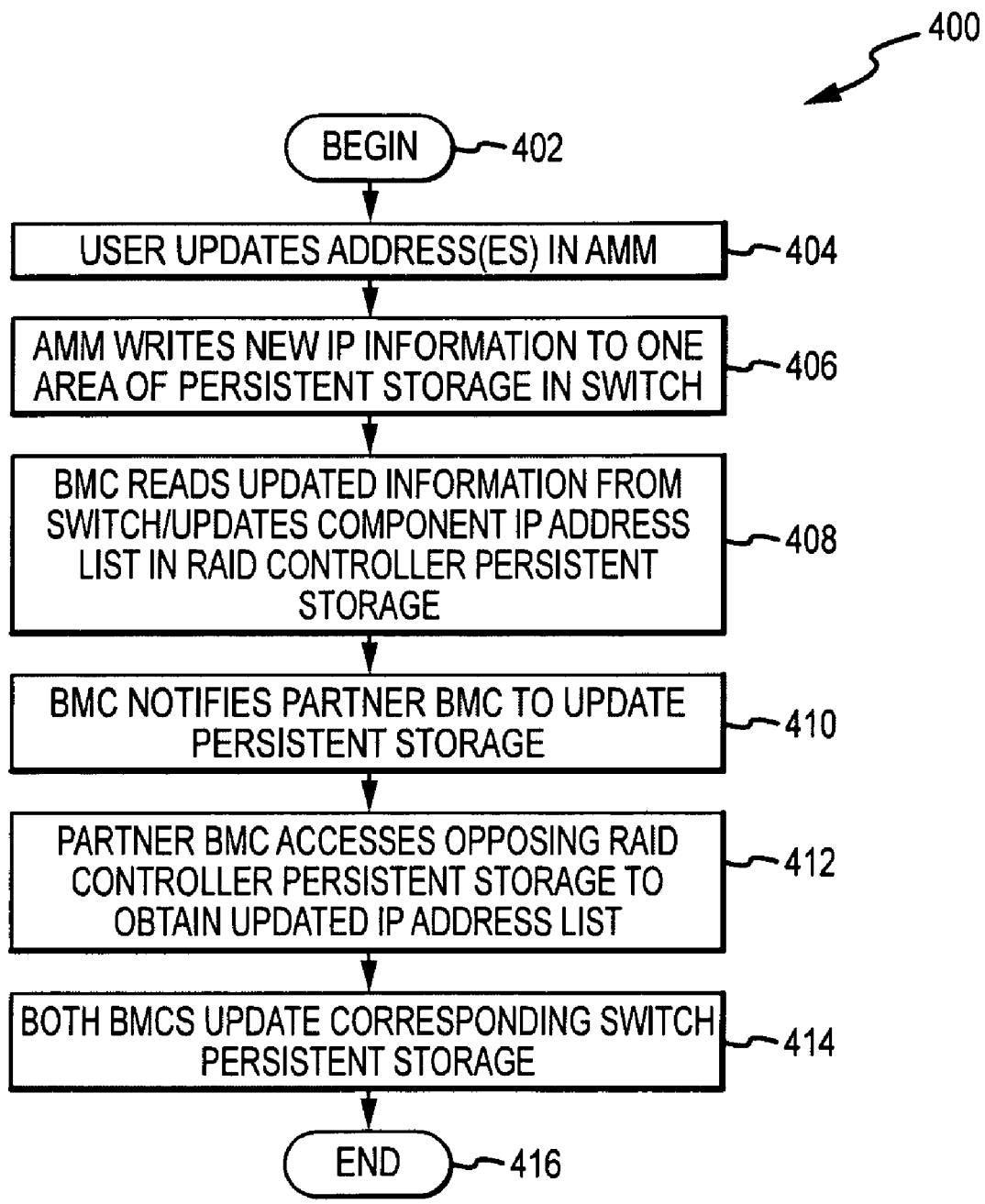
FIG. 3 is a flow chart diagram of an exemplary method for updating component information in a multi-blade server chassis.

FIG. 2, following, is a flow chart diagram of an exemplary method 300 for discovering and validating components in a multi-blade server chassis. FIG. 3, following, is a flow chart diagram of an exemplary method 400 for updating component information in the chassis. As one skilled in the art will appreciate, various steps in the methods may be implemented in differing ways to suit a particular application, as well as in differing orders. In addition, the described methods may be implemented by various means, such as hardware, software, firmware, or a combination thereof operational on or otherwise associated with the blade server environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 2, method 300 begins (step 302) with a user entering information, such as a port IP address, for a component of the chassis (step 304). A switch is queried for additional information for other interconnected components in the chassis, such as additional remaining IP addresses (step 306). Based on the first information, the switch module is instructed to obtain the additional information from a persistent storage location associated with the switch module (step 308). For example, the switch module may cross-reference a provided IP address with remaining addresses in an address table to obtain the additional addresses. The information and additional information obtained is validated (step 309). The user is notified of the additional information and the fact that the information is valid (step 310). Method 300 then ends (step 312).

Turning to FIG. 3, method 400 begins (step 402) with a user updating address information, such as updating one or more of the component IP addresses, in the AMM (step 404). The AMM writes the new IP information to one area of persistent storage in the switch, and the switch notifies its corresponding BMC to obtain updated IP information (step 406). The BMC reads the updated information from the switch and updates the component IP address list in the corresponding RAID controller persistent storage (step 408).

Control then moves to step 410, where the BMC notifies its partner BMC to update its own respective persistent storage. The partner BMC then accesses the initiating BMC's RAID controller's persistent storage to obtain the updated IP address list information (step 412). Both BMCs then update their corresponding switch persistent storage to reflect the updated IP address list information (step 414). The method 400 then ends (step 416).

Control moves to step 312, where the information is then persistently stored on either, or both of, the switch and a BMC in the chassis (step 312). At a later time, a user may update the information, such as update one or more of the IP addresses, in the AMM (step 314). The updated information is updated to the BMC and/or the switch, as a result (step 316). In this way, any application that wishes to manage the entire chassis may have the necessary information to create relationships between the devices in the chassis by accessing the switch and/or the BMC in which the information is stored. Control then moves to step 318, as the method ends.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for discovering components on a multi-blade server chassis having an input/output (I/O) module in communication with a plurality of components managed by an advanced management module (AMM), the I/O module including a switch module, a redundant array of independent disks (RAID) controller and a baseboard management controller (BMC), the method comprising:
receiving a first address for a first component of the plurality of components, wherein the first address is provided by a user;
querying the switch module for additional addresses for additional components of the plurality of components, wherein the switch module obtains the additional addresses for the additional components from a first persistent storage location on the switch module; and
storing the first and additional addresses for the first and additional components in a second persistent storage location accessible by the BMC, the switch module, and the RAID controller, wherein synchronization of the first and additional addresses for the first and additional components in the second persistent storage location is controlled by the BMC.

2. The method of claim 1, further including querying the RAID controller for the additional addresses for the additional components, wherein the RAID controller obtains the additional addresses for the additional components from a third persistent storage location associated with the RAID controller.

3. The method of claim 2, further including, subsequent to a user updating the one of the first and additional addresses in the AMM, writing the one of the first and additional addresses to the first persistent storage location using the AMM.

4. The method of claim 3, further including, subsequent to writing the one of the first and additional addresses to the first persistent storage location using the AMM, updating the one of the first and additional addresses in a third persistent storage location associated with the RAID controller using the BMC.

5. The method of claim 1, further including validating the first and additional addresses in the multi-blade server chassis.

6. The method of claim 5, further including notifying the user the additional addresses for the additional components are valid.

7. The method of claim 1, further including notifying the user the additional addresses for the additional components.

8. A system for discovering components on a multi-blade server chassis having a plurality of components managed by an advanced management module (AMM), comprising:
an input/output (I/O) module in communication with the AMM, the I/O module including a switch module, a redundant array of independent disks (RAID) controller and a baseboard management controller (BMC), wherein the I/O module is adapted for:
receiving a first address for a first component of the plurality of components, wherein the first address is provided by a user, querying the switch module for additional addresses for additional components of the plurality of components, wherein the switch module obtains the additional addresses for the additional components from a first persistent storage location on the switch module, and storing the first and additional addresses for the first and additional components in a second persistent storage location accessible by the BMC, the switch module, and the RAID controller, wherein synchronization of the first and additional addresses for the first and additional components in the second persistent storage location is controlled by the BMC.

9. The system of claim 8, wherein the I/O module is further adapted for querying the RAID controller for the additional addresses for the additional components, wherein the RAID controller obtains the additional addresses for the additional components from a third persistent storage location associated with the RAID controller.

10. The system of claim 9, wherein the I/O module is further adapted for, subsequent to a user updating the one of the first and additional addresses in the AMM:
writing the one of the first and additional addresses to the first persistent storage location using the AMM, and
updating the one of the first and additional addresses in a third persistent storage location associated with the RAID controller using the BMC.

11. The system of claim 8, wherein the I/O module is further adapted for validating the first and additional addresses in the multi-blade server chassis.

12. The system of claim 11, wherein the AMM is adapted for, subsequent to the validating the first and additional addresses by the I/O module, notifying the user the additional addresses for the additional components are valid.

13. The system of claim 11, wherein the AMM is adapted for, subsequent to the validating the first and additional addresses by the I/O module, notifying the user the additional addresses for the additional components.

14. A computer program product for discovering components on a multi-blade server chassis having an input/output (I/O) module in communication with a plurality of components managed by an advanced management module (AMM), the I/O module including a switch module, a redundant array of independent disks (RAID) controller and a baseboard management controller (BMC), the computer program product comprising a computer-readable storage medium having computer-readable program code portions stored therein, the computer-readable program code portions comprising:
a first executable portion for receiving a first address for a first component of the plurality of components, wherein the first address is provided by a user;
a second executable portion for querying the switch module for additional addresses for additional components of the plurality of components, wherein the switch module obtains the additional addresses for the additional components from a first persistent storage location on the switch module; and
a third executable portion for storing the first and additional addresses for the first and additional components in a second persistent storage location accessible by the BMC, the switch module, and the RAID controller, wherein synchronization of the first and additional addresses for the first and additional components in the second persistent storage location is controlled by the BMC.

15. The computer program product of claim 14, further including a fourth executable portion for querying the RAID controller for the additional addresses for the additional components, wherein the RAID controller obtains the additional addresses for the additional components from a third persistent storage location associated with the RAID controller.

16. The computer program product of claim 15, further including a fifth executable portion for, subsequent to a user updating the one of the first and additional addresses in the AMM, writing the one of the first and additional addresses to the first persistent storage location using the AMM.

17. The computer program product of claim 16, further including a sixth executable portion for, subsequent to writing the one of the first and additional addresses to the first persistent storage location using the AMM, updating the one of the first and additional addresses in a third persistent storage location associated with the RAID controller using the BMC.

18. The computer program product of claim 14, further including a fourth executable portion for validating the first and additional addresses in the multi-blade server chassis.

19. The computer program product of claim 18, further including a fifth executable portion for notifying the user the additional addresses for the additional components are valid.

20. The computer program product of claim 18, further including a fifth executable portion for notifying the user the additional addresses for the additional components.

* * * * *